United States Patent [19]

Armond et al.

[11] 3,923,477
[45] Dec. 2, 1975

[54] ADSORPTION SYSTEM

[75] Inventors: John Walter Armond, Great Bookham; David Arthur Webber, Bishops Stortford, both of England

[73] Assignee: The British Oxygen Company Limited, London, England

[22] Filed: Oct. 22, 1974

[21] Appl. No.: 516,987

[30] Foreign Application Priority Data
Oct. 23, 1973  United Kingdom............... 49567/73

[52] U.S. Cl. .............................. 55/25; 55/58; 55/68
[51] Int. Cl.² ......................................... B01D 53/02
[58] Field of Search ............... 55/25, 31, 32, 58, 62, 55/21, 25, 68

[56] References Cited
UNITED STATES PATENTS

| | | | |
|---|---|---|---|
| 3,252,268 | 5/1966 | Stark | 55/25 |
| 3,430,418 | 3/1969 | Wagner | 55/25 |
| 3,719,025 | 3/1973 | Heinze et al. | 55/31 |
| 3,788,037 | 1/1974 | Shell et al. | 55/58 |
| 3,839,847 | 10/1974 | Banikiotes et al. | 55/58 |

Primary Examiner—John Adee
Assistant Examiner—Ethel R. Cross
Attorney, Agent, or Firm—Dennison, Dennison, Meserole & Pollack

[57] ABSTRACT

A process for enriching the proportion of a gas in a gas mixture by passing the mixture through an adsorbent bed under pressure, reducing the pressure by countercurrently venting the adsorbed gas, evacuating residual gas from the bed, restoring the pressure in the adsorbent bed by introducing product quality gas, finally introducing partly enriched gas and then repeating the sequence. Choice of appropriate adsorbents allows enrichment of either oxygen or nitrogen from an air feed.

15 Claims, 1 Drawing Figure

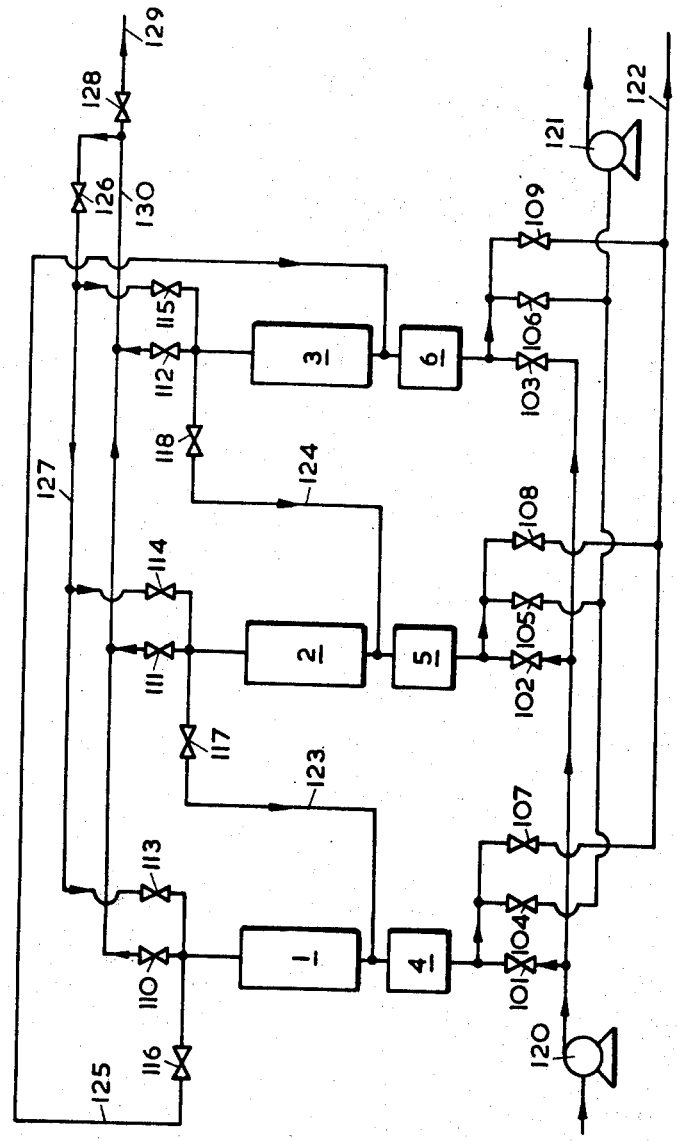

ADSORPTION SYSTEM

FIELD OF THE INVENTION

This invention relates to an absorption system for delivering a gas stream enriched in a desired component by passage through an adsorption bed. It is particularly suited to increasing the proportion of either oxygen or nitrogen in air.

DESCRIPTION OF THE PRIOR ART

The development of molecular sieve materials that permit the separation from one another of gases having closely similar properties has given rise to a wide variety of adsorption systems and a large number of patents relating to adsorption have issued during the past 25 years. Typical examples are U.S. Pat. Nos. 2,661,808, 2,919,764, 2,944,627, 3,086,339, 3,137,549 and 3,430,418. Several problems are encountered in devising and operating such procedures. Thus complete separation of one gas from another cannot be achieved in a single pass through the adsorption bed; the adsorption gas must be periodically removed from the beds so as to restore its adsorption capability and impurities in the gas mixture to be separated tend to contaminate the adsorption bed. The present invention relates to a system in which the arrangement of adsorption beds and the directions of flow of the incoming gas mixture and enriched gas mixtures are arranged to achieve beneficial results at the same time as overcoming the inherent operating problems.

SUMMARY OF THE INVENTION

According to the invention there is provided an adsorption process for increasing the proportion of a desired gas in a mixture of which it is a constituent which comprises the sequential steps of passing the gas mixture at an adsorption pressure in the range 1.1 to 10.0 bars through an adsorption bed that preferentially adsorbs one or more *other* constituents of the mixture, returning the bed to atmospheric pressure by venting the adsorbed gas in a direction counter to the direction of passing the gas mixture, evacuating residual gas from the bed by means of a vacuum pump in the same direction as the venting, restoring the adsorption pressure in the bed by introducing gas of the desired product quality in the same direction as the venting, introducing in the same direction as the gas mixture a partly enriched gas having a content of the desired gas less than the desired product but greater than the gas mixture and then repeating the sequence.

The pressures quoted in this specification are all absolute values.

The system is particularly suited to the separation of either oxygen or nitrogen from air or other oxygen/nitrogen mixtures and, for ease of understanding, is described below with reference to these materials. It is however to be understood that the system can be applied to gas mixtures other than air.

If the desired gas is oxygen then an adsorbent that preferentially adsorbs nitrogen should be used similarly if the desired gas is nitrogen an adsorbent that preferentially adsorbs oxygen should be used. Synthetic zeolite molecular sieves are generally suitable as preferential nitrogen adsorbents. Molecular sieve carbons are generally suitable as preferential oxygen adsorbents. Impurity gases, such as carbon dioxide and water vapour, in the air can be removed in an adsorbent bed separate from the bed for removing oxygen or nitrogen from the air. The adsorbent bed or beds for carbon dioxide and water can either be located at one end of the vessel containing the oxygen or nitrogen enriching adsorbent or can be located in a separate vessel. In an oxygen-enrichment process, i.e. where oxygen is the desired product, it is preferred to employ such separate beds for carbon dioxide and water removal. In a nitrogen enrichment process using a molecular sieve carbon such separate beds are generally unnecessary.

The adsorption pressure is preferably in the range 1.1 to 5.0 bars. For oxygen production the pressure is most preferably 1.3 to 2.0 bars.

The system preferably employs several adsorption beds so as to permit continuous introduction of air, the feed stream being switched to a regenerated and repressurised bed when the adsorption capability of the first bed has been substantially exhausted.

The level of vacuum is usually not critical but would typically be within the range 30 to 300 torr.

The product is preferably withdrawn during the step in which partly enriched gas is introduced into the bed. Since immediately prior to this step the bed has been filled with product quality gas the process of the invention ensures a high level of purity for the product. The partly enriched gas can be withdrawn from a bed undergoing a different part of the sequence.

Zeolites 5A, 4A, 10A and 13X have been found to be particularly good for obtaining oxygen by the process of the present invention. For obtaining nitrogen the pore size of the molecular sieve carbon should be selected to give the optimum oxygen adsorption. The adsorbent for removing moisture and carbon dioxide can be alumina, silica gel or a zeolite.

The feed arrangement is preferably such that partly enriched gas entering the oxygen or nitrogen adsorbent beds has not passed through a purification bed. This ensures that the partly enriched gas is not contaminated with moisture or carbon dioxide before reaching a bed in which it will be further enriched.

By venting and evacuating in a direction counter to that of passing air or partly enriched air, the venting and evacuating steps function also to restore the adsorption capacity of the bed, gas removed from the bed during these steps being discarded as waste. The vented and evacuated gas is passed both through the oxygen or nitrogen adsorbent beds and any purification beds.

The process of the invention accordingly offers the advantage that each bed is regenerated during each cycle and periodic regeneration is therefore unnecessary. A product of high purity compared to that obtainable from most adsorption systems is obtained. The purification beds act as heatless driers and, in that they are by-passed by partly enriched gas can be of a smaller volume than in previous processes. Moreover the introduction of partly enriched gas into the main adsorbent beds assists in giving a product of high purity.

The invention is described below with reference to the accompanying FIGURE which is a diagrammatic flow sheet for an adsorption system according to the invention. It is described (Example 1) with zeolite beds, i.e. for the production of oxygen as the desired product and then (Example 2) with molecular sieve carbon beds, i.e. for the production of nitrogen as the desired product.

The apparatus includes three adsorption beds, 1, 2 and 3. The beds 1, 2 and 3 have associated adsorbent beds 4, 5 and 6 respectively containing activated alumina. The beds 1, 2 and 3 are for the separation of oxygen from nitrogen whereas beds 4, 5 and 6 are for removing moisture and carbon dioxide from incoming air before it reaches the beds 1, 2 and 3.

The pressures quoted are absolute values.

EXAMPLE 1

In this example the beds 1, 2 and 3 contain zeolite molecular sieve 5A.

Atmospheric air is fed into the system by means of a blower 120 which raises the air pressure to 1.5 bars. The incoming air is fed in turn to beds 1, 2 and 3, through inlet valves 101, 102 and 103 respectively. With reference to beds 4 and 1, the air is purified (ie carbon dioxide and moisture are removed) in bed 4 and enriched in oxygen in bed 1. The first cut of oxygen-enriched gas from bed 1 is passed through valve 110, 126 and 115 to restore the working pressure of 1.5 bars in bed 3 (which has previously undergone an evacuation step). After the first few cycles of gas through the beds this backfill gas from bed 1 will be "product quality gas" i.e. of oxygen content equivalent to that of the desired product. The second cut of oxygen enriched gas from bed 1 is passed to bed 3 through valve 116 and line 125, valves 110 and 115 being now closed. As the second cut from bed 1 is introduced into bed 3 the oxygen rich gas emerging from the top of bed 3 is now of product quality and passes through valve 112, line 130 and product outlet valve 128 to the oxygen withdrawal line 129.

At the end of the introduction of the second cut from bed 1 to bed 3 the inlet valve 101 is closed and valve 103 is opened so as to switch the air feed to beds 6 and 3. These function in a similar manner to that described for beds 4 and 1, the first cut of oxygen-enriched gas being returned as backfill to bed 2 through valves 112, 126 and 114 and the second cut being passed as oxygen enriched feed through valve 118 and line 124. Finally the air feed is switched to beds 5 and 2 which provide gas supplies to bed 1. The backfill from bed 2 to bed 1 is through valves 111, 126 and 113 and the oxygen enriched feed in the second cut is through valve 117 and line 123.

While air is being admitted to beds 6 and 3, bed 1 is undergoing first venting to atmospheric pressure and then evacuation to a vacuum of 150 torr. Venting from beds 1 and 4 is through valve 107 and vent line 122 and evacuation is through valve 104 and vacuum pump 121. The equivalent venting and vacuum line for beds 2 and 3 are respectively 105 and 108 for bed 2 and 106 and 109 for bed 3. The accompanying tables show the timing sequence for two cycles according to the invention. The system described in Table A gives intermittent flow of product oxygen but the upper pressure of the system remains constant. In the system shown in Table B product is withdrawn continuously but the upper pressure of the bed providing product fluctuates between a maximum at the end of the second cut and a minimum at the start of the second cut.

With reference to the sequence given in Table A and starting with the beds 1 and 4 at the working pressure of 1.5 bars following the air admission steps, beds 1 and 4 are first vented to atmospheric pressure through valve 107 and line 122. Valve 107 is then closed and valve 104 opened and the beds 1 and 4 evacuated by the vacuum pump. At the end of the evacuation valve 104 is closed and the backfill valve 113 opened, a backfill regulator valve 126 allowing oxygen of product quality to flow from bed 2 through line 127 at the working pressure of the system. When the composition of the gas from bed 2 falls below product quality the valve 111 is closed and valve 117 opens to allow gas of less than product quality to flow in the reverse direction through bed 1 (as second cut). Valve 110 is opened at the same instant as valve 117 so as to allow product quality gas to flow out of bed 1 through the product line 130. After introduction of the second cut, valve 117 is closed and valve 101 opened to allow air to flow through the beds 4 and 1 to displace further gas of product quality from bed 1 through line 130. This is continued until the gas leaving bed 1 falls below product quality whereupon valve 110 is closed and valve 116 opened to pass gas of less than product quality as second cut to bed 3. Air admission continues until the oxygen content of the second cut gas is about 21% oxygen whereupon valves 101 and 116 are closed and the bed is ready to vent and evacuate.

EXAMPLE 2

In this example the beds, 1, 2 and 3 contain molecular sieve carbon.

Atmospheric air is fed into the system by means of a blower 120 which raises the air pressure to 2.5 bars. The incoming air is fed in turn to beds 1, 2 and 3, through inlet valves 101, 102 and 103 respectively. With reference to beds 4 and 1, the air is purified (i.e. carbon dioxide and moisture are removed) in bed 4 and enriched in nitrogen in bed 1. The first cut of nitrogen enriched gas from bed 1 is passed through valve 110, 126 and 115 to restore the working pressure of 2.5 bars in bed 3 (which has previously undergone an evacuation step). After the first few cycles of gas through the beds this backfill gas from bed 1 will be of nitrogen content equivalent to that of the desired product. The second cut of nitrogen enriched gas from bed 1 is passed to bed 3 through valve 116 and line 125, valves 110 and 115 being now closed. As the second cut from bed 1 is introduced into bed 3 the nitrogen rich gas emerging from the top of bed 3 is now of product quality and passes through valve 112, line 130 and product outlet valve 128 to the nitrogen withdrawal line 129.

At the end of the introduction of the second cut from bed 1 to bed 3 the inlet valve 101 is closed and valve 103 is opened so as to switch the air feed to beds 6 and 3. These function in a similar manner to that described for beds 4 and 1, the first cut of nitrogen enriched gas being returned as backfill to bed 2 through valves 112, 126 and 114 and the second cut being passed as nitrogen enriched feed through valve 118 andn line 124. Finally the air feed is switched to beds 5 and 2 which provide gas supplies to bed 1. The backfill from bed 2 to bed 1 is through valves 111, 126 and 113 and the nitrogen enriched feed in the second cut is through valve 117 and line 123.

While air is being admitted to beds 6 and 3, bed 1 is undergoing first venting to atmospheric pressure and then evacuation to a vacuum of 50 torr. Venting from beds 1 and 4 is through valve 107 and vent line 122 and evacuation is through valve 104 and vacuum pump 121. The equivalent venting and vacuum line for beds 2 and 3 are respectively via valves 105 and 108 for bed 22 and 106 and 109 for bed 3.

The timing cycles described in Example 1 can similarly be employed in Example 2 systems. The system described in Table A gives intermittent flow of product nitrogen but the upper pressure of the system remains constant. In the system shown in Table B product is withdrawn continuously but the upper pressure of the bed providing product fluctuates between a maximum at the end of the second cut and a minimum at the start of the second cut.

Instead of air the feed gas in Example 2 can be, for example, waste nitrogen from a cryogenic air separation plant. The process then operates as described for air feed except that then the feed gas would be admitted to the nitrogen enriching bed until the oxygen concentration in the second cut gas matched that of the feed.

TABLE A

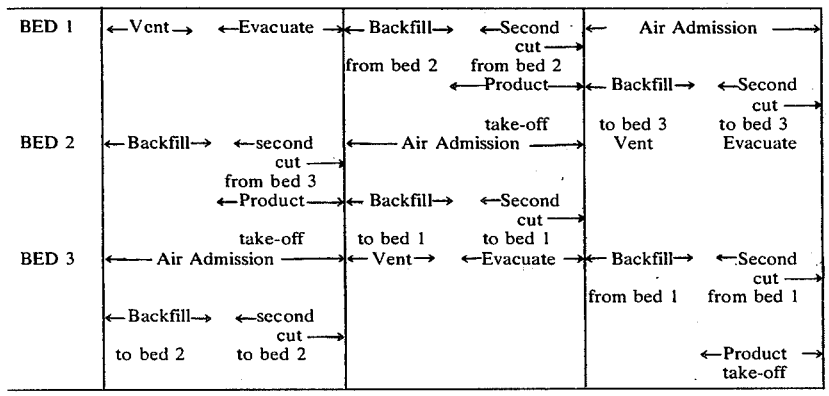

TABLE B

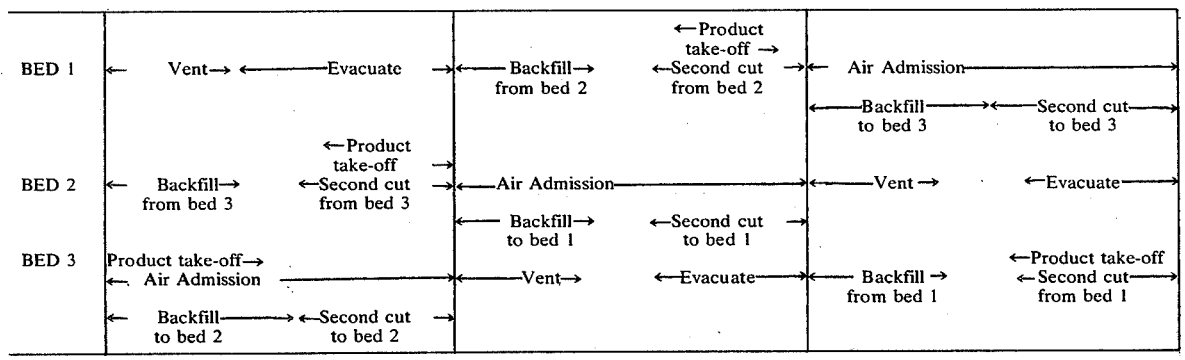

We claim:

1. An adsorption process for increasing the proportion of a desired gas in a mixture of which it is a constituent which comprises the sequential step of passing the gas mixture at a pressure in the range 1.1 to 10.0 bars through an adsorption bed that preferentially adsorbs one or more other constituents of the mixture, returning the bed to atmospheric pressure by venting the absorbed gas in a direction counter to the direction of passing the gas mixture, evacuating residual gas from the bed by means of a vacuum pump in the same direction as the venting, restoring the adsorption pressure in the bed by introducing gas of the desired product quality in the same direction as the venting, introducing in the same direction as the gas mixture a partly enriched gas having a content of the desired gas less than the desired product but greater than the gas mixture and then repeating the sequence.

2. A process as claimed in claim 1 wherein the desired gas is oxygen.

3. A process as claimed in claim 1 wherein the desired gas is nitrogen.

4. A process as claimed in claim 2 wherein the adsorbent is a synthetic zeolite molecular sieve.

5. A process as claimed in claim 4 wherein the adsorbent is zeolite 5A, 4A, 10A or 13X.

6. A process as claimed in claim 3 wherein the adsorbent is a molecular sieve carbon.

7. A process as claimed in claim 1 wherein impurity gases are removed in an adsorbent bed separate from the main adsorbent bed.

8. A process as claimed in claim 7 wherein the separate bed is located in a vessel separate from the vessel containing the main adsorbent bed.

9. A process as claimed in claim 1 wherein several adsorption beds are employed so as to permit continuous introduction of the gas mixture.

10. A process as claimed in claim 1 wherein the adsorption pressure is within the range 1.1 to 5.0 bars.

11. A process as claimed in claim 10 wherein the adsorption pressure is within the range 0.3 to 2.0 bars.

12. A process as claimed in claim 1 wherein the level of vacuum is within the range 30 to 300 torr.

13. A process as claimed in claim 1 wherein product is withdrawn during the step which partly enriched gas is introduced into the bed.

14. A process as claimed in claim 9 wherein the partly enriched gas is withdrawn from a bed undergoing a different part of the sequence.

15. A process as claimed in claim 7 wherein partly enriched gas entering the main bed has not passed through a purification bed.

* * * * *

UNITED STATES PATENT AND TRADEMARK OFFICE
CERTIFICATE OF CORRECTION

PATENT NO. : 3,923,477
DATED : December 2, 1975
INVENTOR(S) : Armond et al

It is certified that error appears in the above-identified patent and that said Letters Patent are hereby corrected as shown below:

Column 6, Claim 11, line 2, delete "0.3 to 2.0 bars" and insert --1.3 to 2.0 bars--.

Signed and Sealed this twelfth Day of July 1977

[SEAL]

Attest:

RUTH C. MASON
Attesting Officer

C. MARSHALL DANN
Commissioner of Patents and Trademarks